(No Model.)

A. WILBUR.
PIPE COUPLING.

No. 483,593. Patented Oct. 4, 1892.

Attest
Walter McAlister
T. L. Middleton

Inventor
Alfred Wilbur
by Ellis Spear
Atty.

UNITED STATES PATENT OFFICE.

ALFRED WILBUR, OF INDIANAPOLIS, INDIANA.

PIPE-COUPLING.

SPECIFICATION forming part of Letters Patent No. 483,593, dated October 4, 1892.

Application filed May 6, 1891. Serial No. 391,720. (No model.)

*To all whom it may concern:*

Be it known that I, ALFRED WILBUR, a citizen of the United States of America, residing at Indianapolis, in the county of Marion and State of Indiana, have invented certain new and useful Improvements in Pipe-Couplings, of which the following is a specification.

My invention is a pipe-coupling, and relates particularly to the class of couplings used principally around the joints of pipes used for natural gas, such as shown in Letters Patent of the United States granted to me on the 17th day of January, 1888, No. 376,458. In the present case I have shown a two-part coupling, as generally old pipe-lines having been laid it is necessary to provide for the stopping of leaks, which may be done without changing all the couplings in use, and I have aimed in the present invention to produce a coupling which may be applied to old lines, and it is my object to secure the same advantages which accrued from the use of my improved coupling shown in the patent referred to. In that patent the coupling is shown entire, and consists of an inclosing-sleeve for the pipe ends with an interior chamber having an opening to the outside for the reception of a suitable filling, with grooves at the ends adapted to receive rope gaskets, which are compressed around the pipe.

Figure 2:
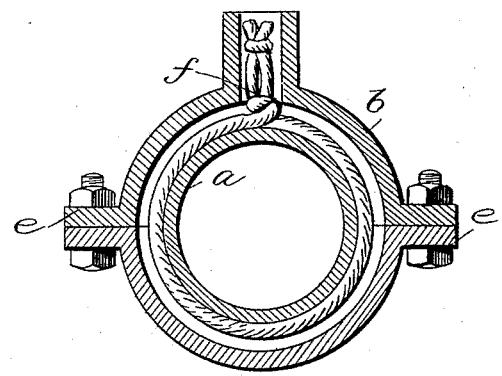
Figure 1:
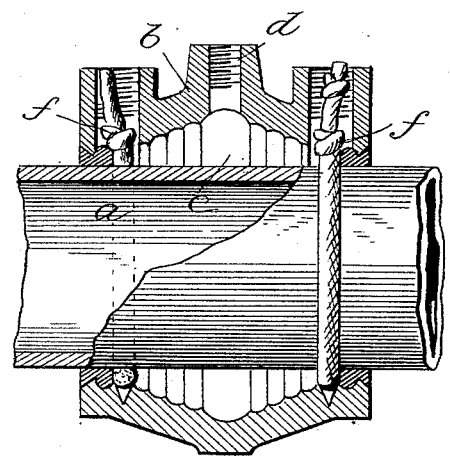

In the accompanying drawings I have shown the inclosing sleeve in longitudinal section in Figure 1, and in Fig. 2 in cross-section.

The pipe-line is shown at $a$ and the inclosing sleeve at $b$. This sleeve has an interior chamber $c$ with an opening $d$ to the outside for the reception of a suitable filling, as in my patent referred to. It is made in sections, as shown in Fig. 2, each section being provided with flanges bolted together, as shown at $e$. The grooves at the ends of the inclosing sleeve corresponding to the grooves shown in my aforesaid patent are made, preferably, V-shaped and of greater depth than the grooves shown in the patent, so as to secure a wedging action between the sleeve and the gaskets and at the same time provide a space in rear of the gaskets to receive some of the filling, which will tend to make the joints gas-tight and at the same time preserve the rope.

In applying my invention I take the pieces of rope and tie them around the pipe tightly at proper intervals apart. I then place the lower half of the sleeve in contact with the pipe, properly fitting the rope gaskets to the grooves. I make the rope gaskets a little longer than the circumference of the pipe, and after tying them at the point $f$ I tie them at their extreme ends, thus causing the connected ends to remain upright, as in Fig. 2. I then slip on the upper half of the sleeve the tied ends of the gaskets, passing through the end opening. The filling is then poured into the end openings, and it will find its way in rear of the rope gaskets and thus add in making the joint gas-tight.

The rope gasket must be a little larger than the groove, so as to fill the space between the pipe and the rib-bearing of the sleeve, as the bore of the sleeve must necessarily be a little larger than the pipe, so as to compensate for the variation of pipe, which is very common, and also to make the sleeve flexible.

I am aware that it is not new to make a joint by interposing a gasket or packing between two adjacent faces, said faces being provided with grooves V-shaped in cross-section, the packing being adapted to conform to the shape of these grooves, and I do not claim so broadly as to include such construction, my purpose being by the use of V-shaped grooves in connection with the rope gaskets to provide a space in rear of them into which the filling may run so as to preserve the gaskets and have them entirely inclosed by the filling.

I claim as my invention—

A pipe-coupling consisting of an inclosing sleeve for the pipe ends, providing an interior chamber for a suitable filling, rope gaskets surrounding the pipe ends within the sleeve, and V-shaped grooves adapted to receive the gaskets, whereby a space is left in the rear of the gaskets for receiving a filling and thus preserve the gaskets and at the same time prevent the passage of gas in rear of the same, substantially as described.

In testimony whereof I affix my signature in presence of two witnesses.

ALFRED WILBUR.

Witnesses:
W. N. HARDING,
JAS. A. NEW.